United States Patent [19]
Rhoades et al.

[11] Patent Number: 5,551,746
[45] Date of Patent: Sep. 3, 1996

[54] SIDE WINDOW ARRANGEMENT FOR A VEHICLE

[75] Inventors: Christopher Rhoades, Ostelsheim; Lucian Reindl, Weil der Stadt; Harald Leschke, Sindelfingen, all of Germany

[73] Assignee: Mercedes-Benz AG, Stuttgart, Germany

[21] Appl. No.: 267,929

[22] Filed: Jul. 6, 1994

[30] Foreign Application Priority Data

Jul. 6, 1993 [DE] Germany .......................... 43 22 432.6

[51] Int. Cl.⁶ .................................................. B06J 1/17
[52] U.S. Cl. ......................... 296/146.2; 296/208; 49/38; 49/502; 454/128; 454/143
[58] Field of Search ........................... 296/146.2, 146.1, 296/208, 146.16; 49/38, 502; 454/128, 143, 195

[56] References Cited

U.S. PATENT DOCUMENTS

| | | |
|---|---|---|
| 2,059,924 | 11/1936 | Woina . |
| 3,391,628 | 7/1968 | Ziegenfelder ............................ 454/195 |
| 4,546,693 | 10/1985 | McTaw ........................................ 49/38 |

FOREIGN PATENT DOCUMENTS

| | | |
|---|---|---|
| 949386 | 9/1956 | Germany . |
| 2952177 | 6/1981 | Germany . |
| 3428612 | 2/1986 | Germany . |
| 8813675 | 2/1989 | Germany . |
| 121521 | 5/1988 | Japan ..................................... 296/208 |

*Primary Examiner*—Gary C. Hoge
*Attorney, Agent, or Firm*—Evenson, McKeown, Edwards & Lenahan

[57] ABSTRACT

A side window arrangement is disclosed which has main and auxiliary window cutouts which are separated from one another and are arranged one behind the other in the opening direction of the window, a window side pane having an opening which can be moved into the auxiliary window cutout. The auxiliary window cutout serves as a ventilation cutout located underneath the main window cutout. This arrangement contrasts with known side windows, which, when opened by a small gap to ventilate the vehicle internal space, causes the occupants of the vehicle to be adversely affected by air eddying occurring at head level and by aerodynamic noise. In the case of obliquely previously known arranged side windows, water enters when it is raining even if the windows are only opened slightly.

6 Claims, 2 Drawing Sheets

5,551,746

SIDE WINDOW ARRANGEMENT FOR A VEHICLE

BACKGROUND AND SUMMARY OF THE INVENTION

The invention relates to a side window arrangement for a vehicle with a side pane guided in a side section.

Side windows of this type are generally known and are brought into effect in many motor vehicles. The side panes can be lowered electrically or by actuating a crank in order to ventilate the internal compartment of the vehicle. The amount of fresh air supplied is regulated by opening the window to different extents. If only a little fresh air is to be supplied, the window is only opened by a small gap. Because this gap is located at the head level of the occupants of the vehicle, the latter can be adversely affected by the resulting eddying of the air. In addition, unpleasant aerodynamic noises occur. Particularly in the case of modern vehicles without water gutters on the edge of the roof and with obliquely arranged side windows, water enters when it is raining even when the window is only slightly open.

A side window for motor vehicles with a trapezoidal window pane is known from German Patent Specification 949,386 in which the height of the window trapezium is dimensioned in such a way that when the two side gaps are freed, the upper edge of the window is still closed. By this means, and using only one window pane, an air gap is freed at both narrow sides of the window immediately on lowering it without a gap being additionally formed at the upper edge of the window.

Window inserts for a window pane of a motor vehicle in the form of a transparent insert pane with several ventilation openings are known from German Patent Documents DE 88 13675 U1 and DOS 34 28 612. When the side window is partially opened, these window inserts can be placed on the side pane and clamped between the latter and the window frame.

German Patent Document DOS 29 52 177 describes a side window for motor vehicles which consists of a stationary upper part and a lower part which can be opened, the latter part being configured as a crank operated window and the split line, between the stationary window part and the window part which can be opened, extending approximately at the level of the belt line of the vehicle.

An object of the invention is to provide a side window arrangement with improved ventilation possibilities.

This object is achieved by preferred embodiments of the invention by a side window arrangement for a vehicle with a side pane displaceably guided in a side section comprising a main window cutout and an auxiliary window cutout in the side section which are separate from one another and are arranged one behind the other in an opening direction of the window side pane, and an opening in the side pane which can be aligned with the auxiliary window cutout during movement of the side pane in the opening direction.

In the relevant side section of the motor vehicle, an auxiliary window cutout is provided which forms, for example, a ventilation Cutout and which is separate from the main window cutout. The main window cutout forms, for example, a conventional window cutout. When the window is closed, both window cutouts are covered by one and the same window pane. When the window is opened, an opening in the side pane can be moved into the auxiliary window cutout of the side section so that a ventilation opening occurs which is separated from the actual window formed by the main window cutout. The adverse effects on the occupants of the vehicle due to draughts and aerodynamic noise are reduced or obviated by appropriate arrangement of the ventilation cutout. When the window is closed, the opening of the side pane is advantageously covered by a web of the side section separating the two window cutouts so that when the window is closed, the ventilation cutout is also closed.

In a particularly advantageous embodiment of the invention, the main window cutout is still completely covered even when the auxiliary window cutout is completely freed by the opening in the side pane. This permits particularly unobtrusive and fine metering of the ventilation. By appropriate design, it is therefore possible to open the ventilation cutout only or the ventilation cutout together with a window gap or the window only.

In a further advantageous embodiment, the auxiliary window cutout is arranged below the main window cutout and the opening in the side pane can be moved into the auxiliary window cutout by lowering the side pane. The auxiliary window cutout is therefore located approximately at the level of the belt line of the vehicle, where ventilation is particularly pleasant. Particularly in the case of rainy weather, this provides a ventilation possibility which combats misting of the panes while reducing the probability of rain finding its way in.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
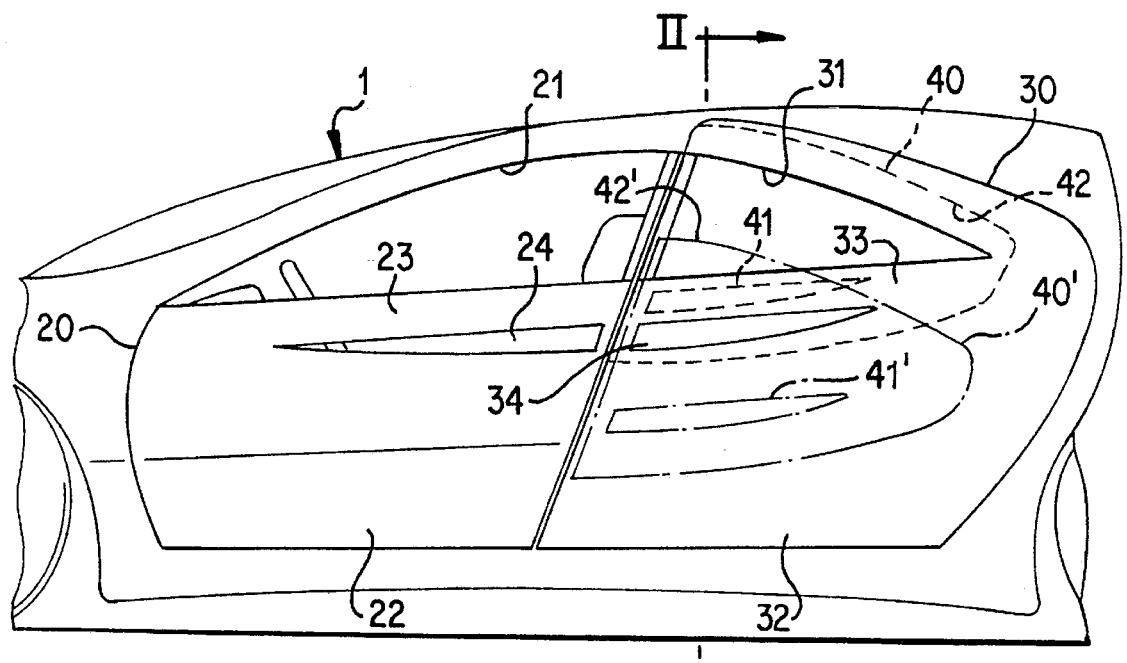
FIG. 1 shows, in a side view, a section of a side part of a motor vehicle with a side window arrangement in accordance with the invention having a main window cutout and an auxiliary ventilation cutout.

FIG. 1 shows the left-hand side part of a motor vehicle (1) with a side window arrangement in accordance with the invention with vertically displaceable side panes. The left-hand side part shown of the motor vehicle (1) has a driver's door (20) and a rear door (30). Both doors (20, 30) represent side sections which respectively have a first window cutout (21) or (31) representing the actual window opening and a second window cutout which is separated from the first by a horizontal web (23) or (33) and forms a ventilation cutout (24) or (34). The ventilation cutouts (24, 34) are located below the actual window openings, i.e., they are respectively arranged after the latter in the opening direction of the window, i.e., downwards. The two ventilation cutouts (24, 34) respectively extend, essentially horizontally, from the door edge running along the B-pillar of the motor vehicle (1) over approximately ¾ of the width of the respective window cutout (21) or (31). At their ends located remote from the B-pillar, the ventilation cutouts (24) and (34) come to a point. The panes inserted in the window cutouts (21, 31) of the driver's door (20) and the rear door (30) can be lowered into the lower sections (22, 32) of the doors (20, 30).

To make the invention easier to understand, the rear door (30) is shown in FIG. 1 in a phantom view. A pane (40) (shown by interrupted lines) is arranged in the rear door (30) and has an opening (41) which is covered by the web (33) when the window is closed.

This web (33) separates the window cutout (31) and the ventilation cutout (34) of the rear door (30). The opening (41) corresponds substantially to the ventilation cutout (34) in size and shape. When the pane (40) is lowered, the opening (41) is moved into the ventilation cutout (34), the size of the pane (40) being dimensioned in such a way that when the ventilation cutout (34) is completely freed by the opening (41), the upper edge (42) of the pane (40) is still in the frame of the rear door (30) so that the window cutout (31) is still closed.

A partially lowered position of the pane (40') (chain-dotted) is also shown in FIG. 1. In this position, the opening (41') of the pane (40') has been lowered into the lower section (32) of the rear door (30). The upper edge (42') of the pane (40') partially protrudes into the window cutout (31) whereas the ventilation cutout (34) is completely filled by the pane (40') and is therefore closed.

The mode of operation of the side door arrangement in accordance with the invention is explained below with reference to FIG. 2 to 4.

Figure 2:
FIG. 2 shows a section through the side window arrangement along the line II—II of FIG. 1 with the window closed.
Figure 2:
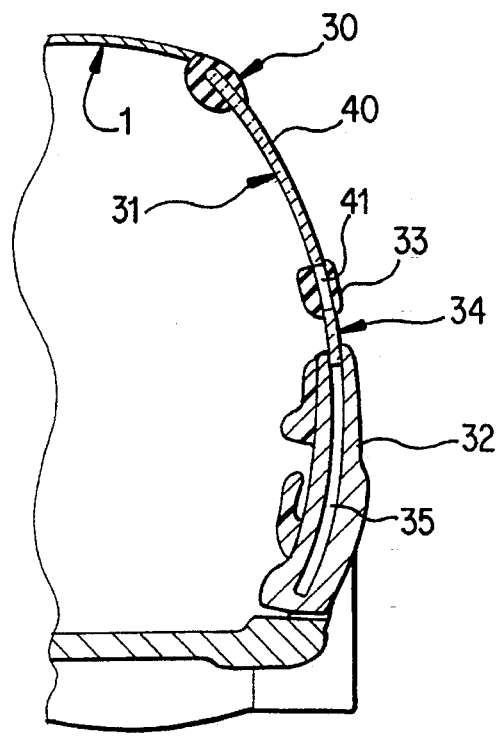
Figure 3:
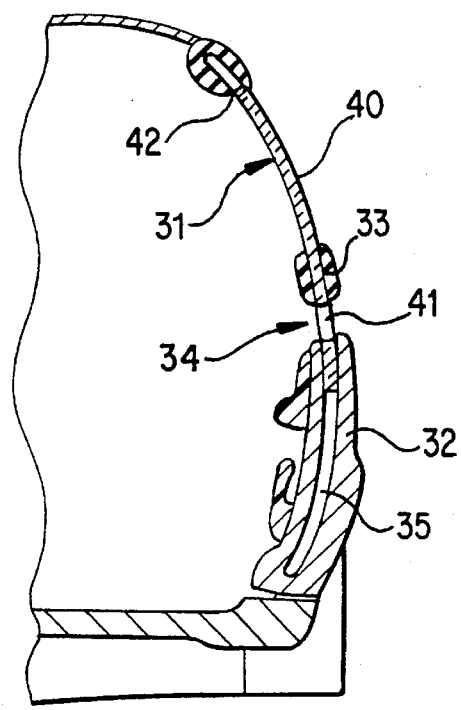
FIG. 3 shows the section of FIG. 2 with the ventilation cutout open.
Figure 4:
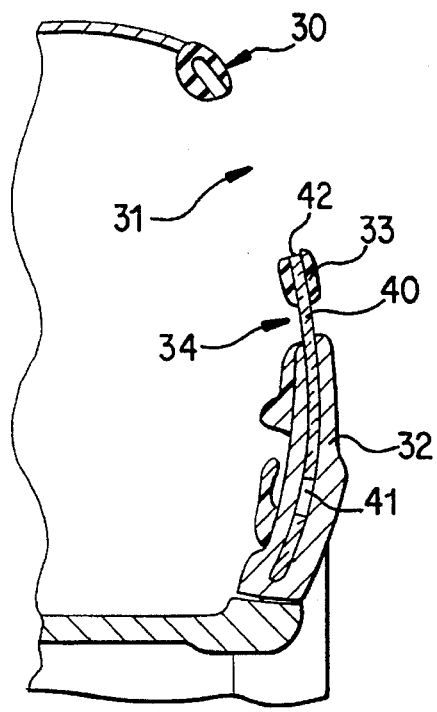
FIG. 4 shows the section of FIG. 2 and 3 with the window cutout open.

FIG. 2 to 4 show a section through the rear door (30) of FIG. 1 along the section line II—II. FIG. 2 shows the side window arrangement of the rear door (30) when the pane (40) is completely raised, i.e., when the window is closed. In this position, the opening (41) of the pane (40) is covered by the web (33). The window cutout (31) arranged above the web (33) and the ventilation cutout (34) arranged below the web (33) are each closed by the pane (40).

When the pane (40) is lowered, the latter moves in a guide channel (35) in the internal space in the lower section (32) of the door. The Opening (41) of the pane (40) moves out from behind the web (33) into the ventilation cutout (34). In the position shown in FIG. 3, the opening (41) is completely located in the ventilation cutout (34) so that the latter is opened to its maximum extent. The pane (40) is dimensioned in such a way that its upper edge (42) is Still located in the upper frame of the rear door (30) so that the window cutout (31) is still closed.

When the pane (40) is lowered further, the window cutout (31) is then freed whereas the ventilation cutout (34) is closed again to the same extent. Such a position is the position of the pane (40') shown chain-dotted in FIG. 1.

In FIG. 4, finally, the pane (40) has been completely lowered. The upper edge (42) of the pane (40) is then located in the web (33) of the rear door (30) so that the window cutout (31) is completely open. The opening (41) of the pane (40) is located in the lower section (32) of the door. The ventilation opening (34) is covered by the pane (40) (at the position of the section line II—II). The upper edge (42), of the pane (40), which runs obliquely downwards towards the rear, frees a rear section of the ventilation cutout (34) when the pane (40) is completely lowered. As an alternative, end positions of the lowered pane (40) can be provided for which the ventilation cutout (34) is completely freed or completely covered.

Summarizing, the following ventilation positions are therefore possible by means of the side window arrangement shown:

Window cutout (31) and ventilation cutout (34) completely closed;

Window cutout (31) completely closed, ventilation cutout (34) partially to completely open;

Window cutout (31) partially open from the top, ventilation cutout (partially open from the bottom;

Window cutout (31) partially to completely open ventilation cutout (34) closed to partially open from the rear.

By means of the embodiment of a side window arrangement according to the invention, it is therefore possible to ventilate the internal space of a motor vehicle in a specific manner without the actual window having to be opened. This combats adverse effects on the occupants due to air eddying and aerodynamic noise. Such an embodiment also has favorable effects on the vehicle aerodynamics. Opening the ventilation cutout is sufficient to prevent misting of the window panes when it is raining. The window does not therefore have to be opened from the top so that the danger of rain entering the inside of the vehicle is averted.

The side window arrangement according to the invention therefore opens new perspectives for vehicle styling. As an example, the position and shape of the ventilation cutouts can be varied. In particular, these can be arranged in terms of an improved all-round view, particularly for the driver.

The invention will mainly find application in passenger cars with windows which can be lowered. The principle on which the invention is based is not, however, limited to this application; it is quite possible to apply it to other windows. As an example, application is also conceivable and advantageous in the case of sliding windows of, for example, small buses or delivery vans.

Furthermore, the invention is not limited to the embodiment represented and described in a side door but can also be realized in stationary side sections of a vehicle, for example in the rear side section of a 3-door passenger car. In addition, it is possible to provide a flap which can be actuated from inside the vehicle and by means of which the auxiliary window cutout can be closed so that the side window arrangement can also, optionally, be used as a conventional side window.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Side window arrangement for a vehicle with a side pane displaceably guided in a side section, comprising:

a main window cutout and an auxiliary window cutout in the side section which are separate from one another and are arranged one behind the other in an opening direction of the window side pane;

an opening in the side pane which can be aligned with the auxiliary window cutout during movement of the side pane in the opening direction; and wherein the side pane and cutouts are configured such that the opening of the side pane is covered by a web separating the window cutouts when the window is closed.

2. Side window arrangement according to claim 1, wherein the side pane and cutouts are configured such that the main window cutout remains completely covered even when the auxiliary window cutout is completely freed by the opening in the side pane.

3. Side window arrangement according to claim 1, wherein the auxiliary window cutout is arranged below the main window cutout and wherein the side pane and cutouts are configured such that the opening in the side pane can be moved into the auxiliary window cutout by lowering the side pane.

4. Side window arrangement according to claim 2, wherein the auxiliary window cutout is arranged below the main window cutout and wherein the side pane and cutouts are configured such that the opening in the side pane can be moved into the auxiliary window cutout by lowering the side pane.

5. Side window arrangement according to claim 1, wherein the auxiliary window cutout and the main window cutout taper to a point in the same longitudinal direction of the vehicle.

6. Side window arrangement according to claim 4, wherein the auxiliary window cutout and the main window cutout taper to a point in the same longitudinal direction of the vehicle.

* * * * *